(12) United States Patent
Cheng

(10) Patent No.: US 6,902,142 B1
(45) Date of Patent: Jun. 7, 2005

(54) CUP BOTTOM EXTENSION APPARATUS

(76) Inventor: William Cheng, Rm. 3E01 No. 5 Sec. 5, Hsinyi RD, Taipei (TW)

( * ) Notice: Subject to any disclaimer, the term of this patent is extended or adjusted under 35 U.S.C. 154(b) by 0 days.

(21) Appl. No.: 10/838,253

(22) Filed: May 5, 2004

(51) Int. Cl.$^7$ .......................... A47K 1/08; A47G 23/02
(52) U.S. Cl. ..................... 248/311.2; 248/313; 248/154
(58) Field of Search ............................. 248/311.2, 313, 248/310, 316.1, 316.5, 154, 346.03

(56) References Cited

U.S. PATENT DOCUMENTS

| | | | | |
|---|---|---|---|---|
| 385,522 | A | * | 7/1888 | Pierce ......................... 248/310 |
| 1,424,607 | A | * | 8/1922 | Wisenberg .................. 248/313 |
| 3,129,569 | A | * | 4/1964 | Ballantyne .................. 248/310 |
| 5,054,733 | A | * | 10/1991 | Shields ........................ 248/313 |
| 5,143,338 | A | * | 9/1992 | Eberlin ........................ 248/313 |
| 5,154,380 | A | * | 10/1992 | Risca .......................... 248/154 |
| 5,398,898 | A | * | 3/1995 | Bever .......................... 248/154 |
| 5,560,578 | A | * | 10/1996 | Schenken et al. ........... 248/313 |
| 6,491,265 | B2 | * | 12/2002 | Tracy .......................... 248/154 |
| 6,705,580 | B1 | * | 3/2004 | Bain ........................ 248/311.2 |

* cited by examiner

Primary Examiner—Anita M. King
(74) Attorney, Agent, or Firm—Birch, Stewart, Kolasch & Birch, LLP.

(57) ABSTRACT

A cup bottom extension apparatus includes a shell, a bottom tray and a plurality of paws. The shell may be coupled with the bottom of a cup in an integrated or detachable manner. Each of the paws has a stud shaft to couple with an axle hole formed on the bottom of the shell so that the paws are in contact with the bottom side of the shell in a spaced manner. The bottom tray has a latch member on the top side to couple with a step opening formed in the center of a collar on the bottom of the shell. The upper surface of the bottom tray has a plurality of struts to couple with the slots of the paws. Thereby the paws are sandwiched between the bottom side of the shell and the upper surface of the bottom tray. When one paw is driven outwards by an external force, the stud shaft serves as a fulcrum to allow the paw to be moved outwards from the periphery of the shell, and the bottom tray is driven to turn and extend the rest of the paws outwards to form a large area outside the periphery of the shell to hold the cup steadier.

4 Claims, 6 Drawing Sheets

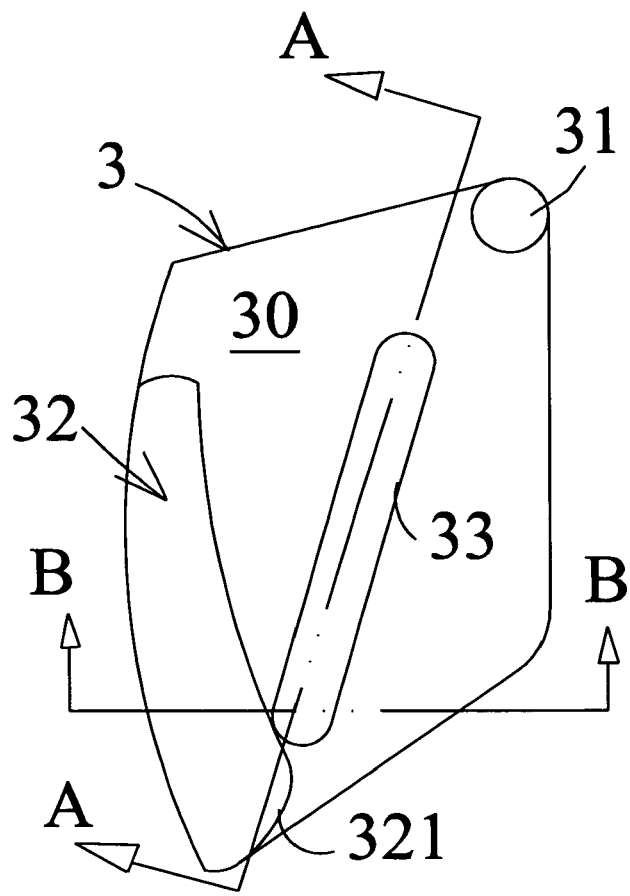
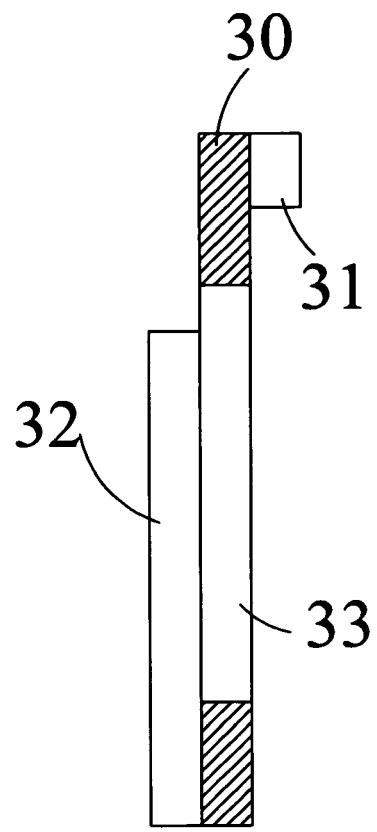
FIG.4a  FIG.4b
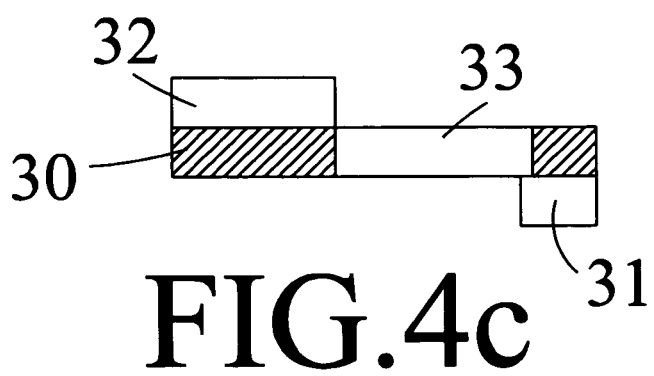
FIG.4c

CUP BOTTOM EXTENSION APPARATUS

BACKGROUND OF THE INVENTION

1. Field of the Invention

The invention relates to a cup and particularly to a cup bottom extension apparatus located on the bottom of a cup that has hidden paws which may be swiveled outwards to expand the holding area of the cup bottom to increase the steadiness of the cup.

2. Description of the Prior Art

Conventional cups used in cars usually are formed in a shape with a larger opening and a smaller bottom end such as a conical shape or a goose neck bottom end to mate the opening size of the circular cup holding bracket. Once the cup is removed from the holding bracket, the smaller cup bottom is difficult to maintain the steadiness of the gravity center, and the cup tend to topple easily.

For general users to drink in the cars, they might bring the cups readily used in home into the cars without select cups suitable for use in the car. The present cups that are specially designed for use in the cars are difficult to use if there are no cup holding brackets.

SUMMARY OF THE INVENTION

The primary object of the present invention is to resolve the problem of the cup that has a larger opening and a smaller bottom area that does not have steady positioning power and easily topples in the occasions where the cup holding bracket is not available, and to provide an apparatus that can expand the resting area of the cup bottom according to requirement to enhance the positioning steadiness of the cup.

In order to overcome the disadvantages occurred to the conventional cups mentioned above, the cup bottom extension apparatus of the invention includes a shell to couple with the cup bottom, a bottom tray and a plurality of paws. The shell is formed in the shape of a box with a recess and a bottom with a plurality of axle holes formed thereon and a collar extending outwards. The paws have respectively a stud shaft to couple with the axle hole and are located on the bottom side of the shell and spaced from one another. The bottom tray has a latch member to couple with the collar of the shell and struts to couple with slots formed on the paws. Thereby the paws are sandwiched between the bottom side of the shell and the bottom tray. When one paw is moved outwards by an external force, the stud shaft of the paw serves as a fulcrum and the paw may be moved and extended outwards from the periphery of the shell, and the bottom tray will be turned to drive the rest of the paws to extend outwards. Thereby a larger area is formed around the periphery of the shell to hold the cup steadily even without the cup bracket.

Adopting the embodiment of the invention set forth above, the drawbacks of the conventional car cup that is heavy on the top and light on the bottom and unsteady positioning may be improved, the paws may be swiveled to extend or retract as desired to suit the bottom size of the cup. And this invention not only can be used in cars, it may also be used in homes and other occasions so that users do not have to buy many different types of cups to suit different environments. It is more convenient and economical.

The foregoing, as well as additional objects, features and advantages of the invention will be more readily apparent from the following detailed description, which proceeds with reference to the accompanying drawings.

BRIEF DESCRIPTION OF THE DRAWINGS

FIG. 4a is a top view of the paw of the invention.

FIG. 4b is a right sectional view of the paw of the invention.

FIG. 4c is a front sectional view of the paw of the invention.

DESCRIPTION OF THE PREFERRED EMBODIMENTS

Figure 1:
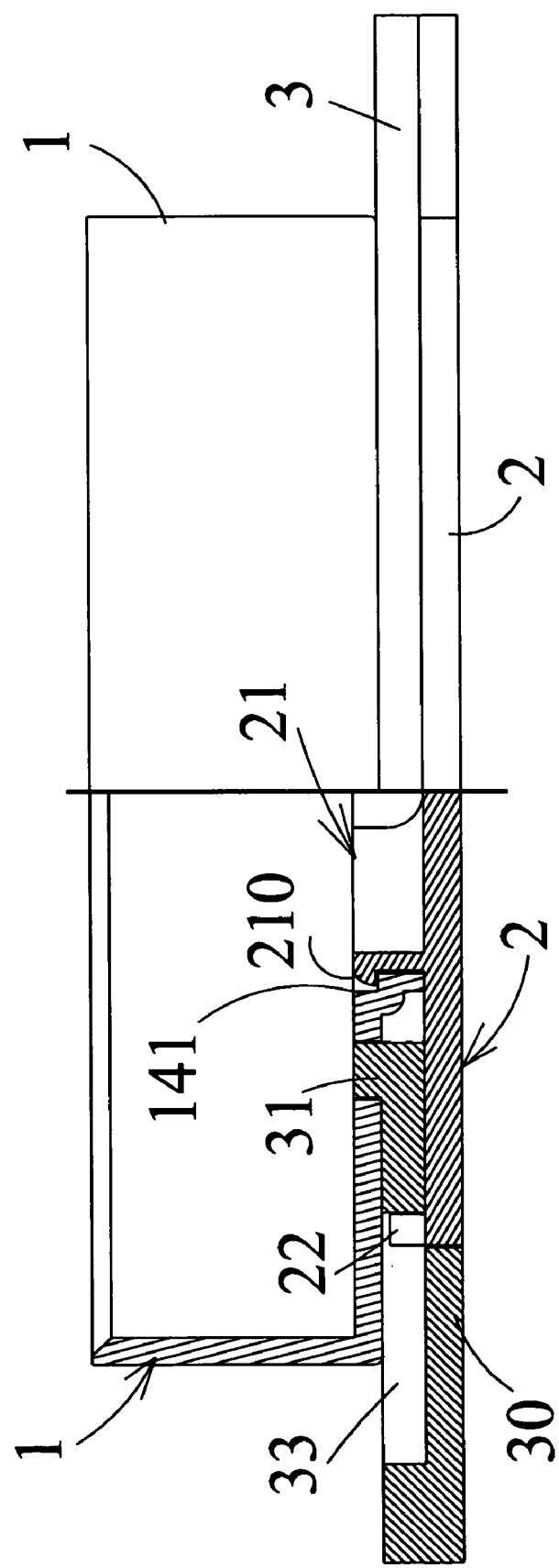
FIG. 1 is a schematic view of the invention, partly cutaway.
Figure 2A:
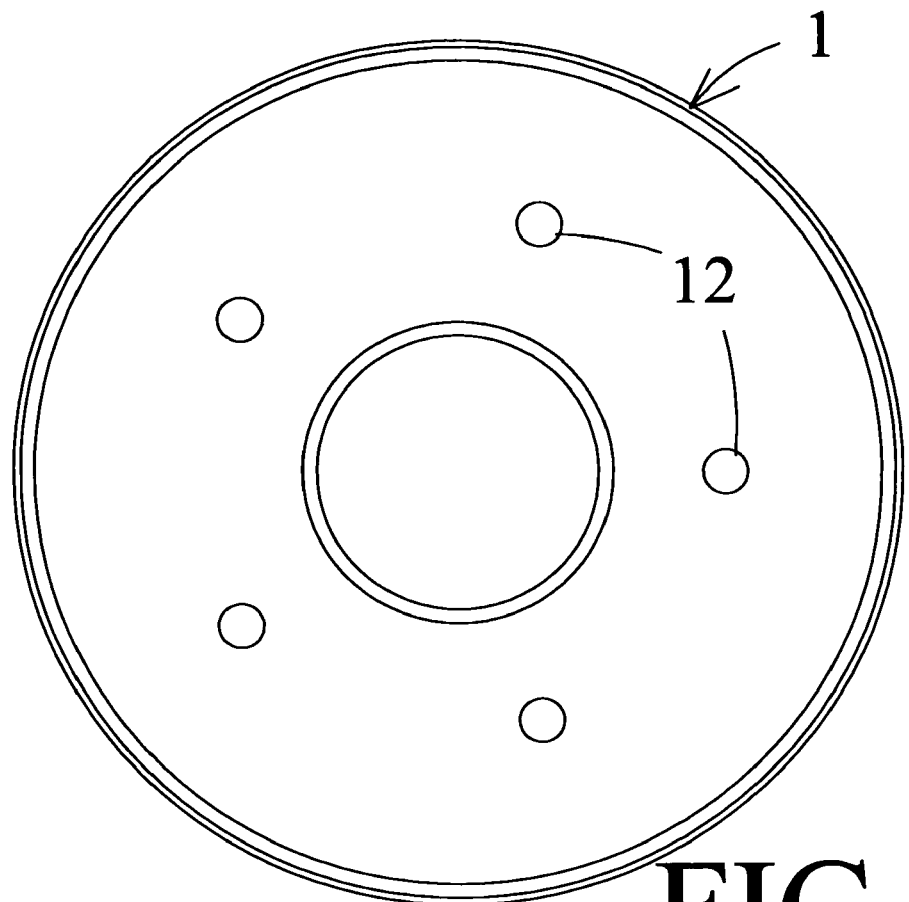
FIG. 2a is a top view of the shell of the invention.
Figure 2B:
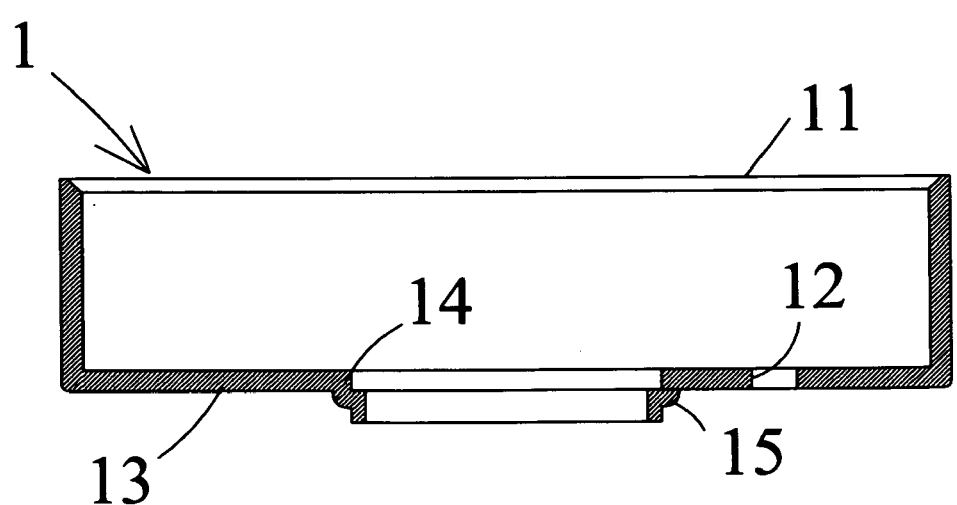
FIG. 2b is a front sectional view of the shell of the invention.

Refer to FIG. 1 for an embodiment of the cup bottom extension apparatus of the invention. It includes a shell 1 coupling with the bottom of a cup, a bottom tray 2 and a plurality of paws 3. As shown in FIGS. 2a and 2b, the shell 1 is formed in the shape of a box with a recess. It has an opening 11 on the top and a bottom 13 with a plurality of axle holes 12 formed thereon. The lower side of the bottom 13 has a step opening 14 in the center and a collar 15 surrounding the step opening.

Figure 3A:
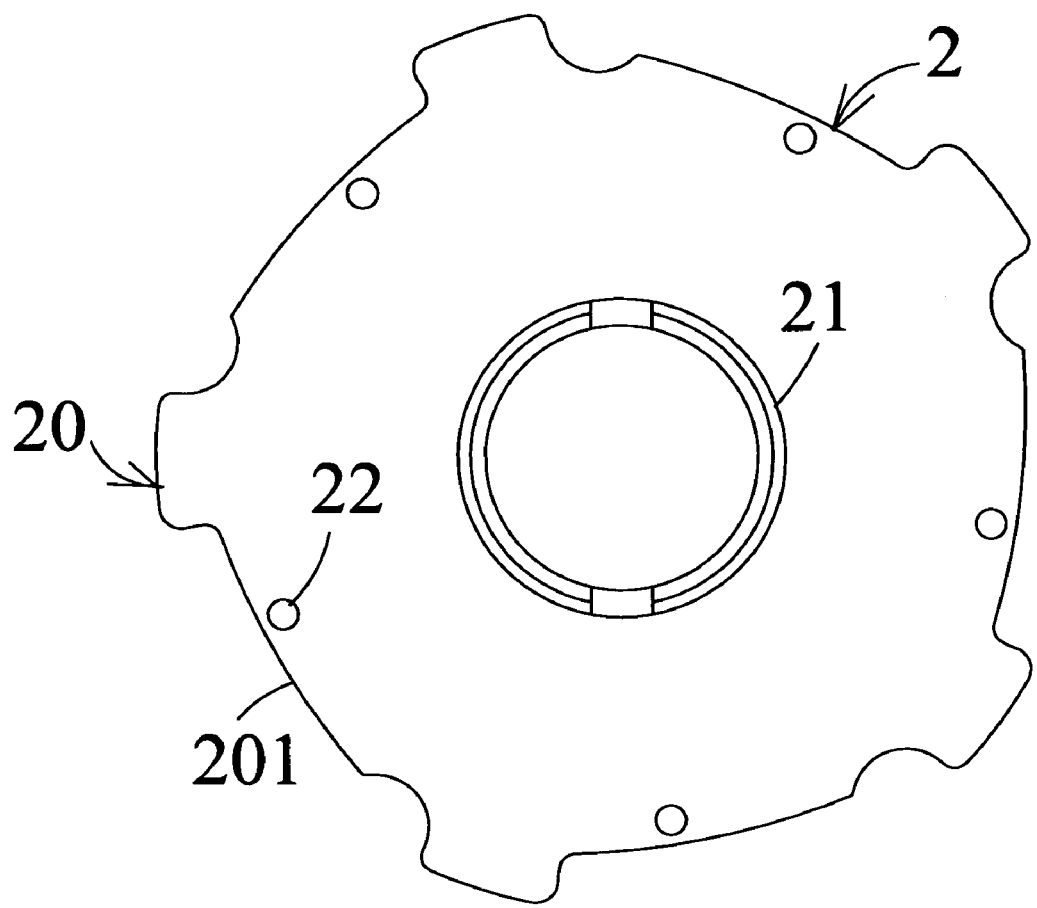
FIG. 3a is a top view of the bottom tray of the invention.
Figure 3B:
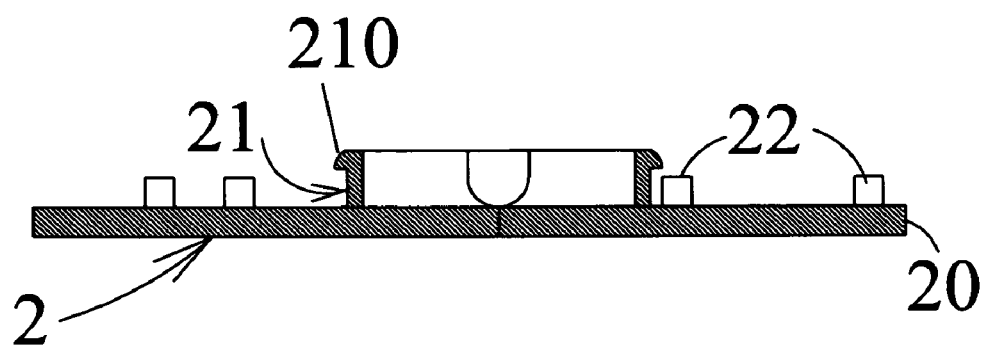
FIG. 3b is a front sectional view of the bottom tray of the invention.

Referring to FIGS. 3a and 3b, the bottom tray 2 has a tray surface 20 which has a latch member 21 extended upwards in the center that has a hook section 210 on an opening end and struts 22 located around the latch member 21 and extended from the tray surface 20. The peripheral rim of the tray surface 20 forms a plurality of recesses 201 to accommodate the paws 3.

Referring to FIGS. 4a, 4b and 4c, the paw 3 includes a plate 30, a stub shaft 31 located on one side of the plate, an elongate extension 32 on other side, and a slot 33 between the stub shaft 31 and the elongate extension 32.

Figure 5A:
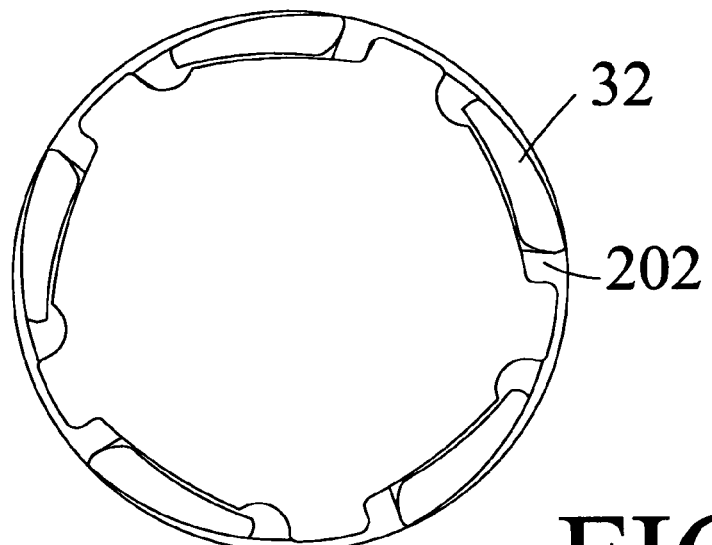
FIG. 5a is a bottom view of the invention with the paws in a retracted condition.
Figure 5B:
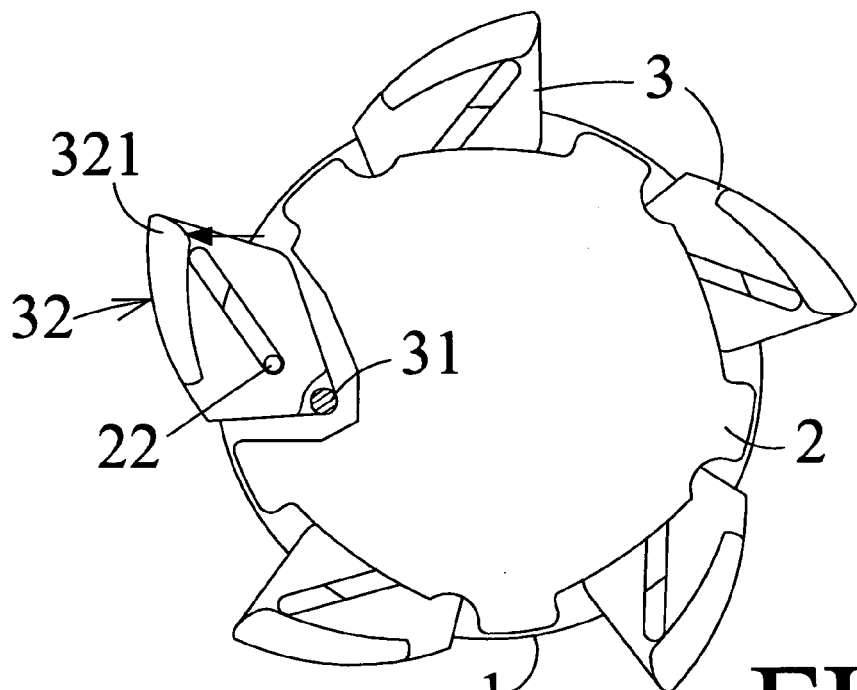
FIG. 5b is a bottom view of the invention with the paws in an extended condition.
Figure 6:
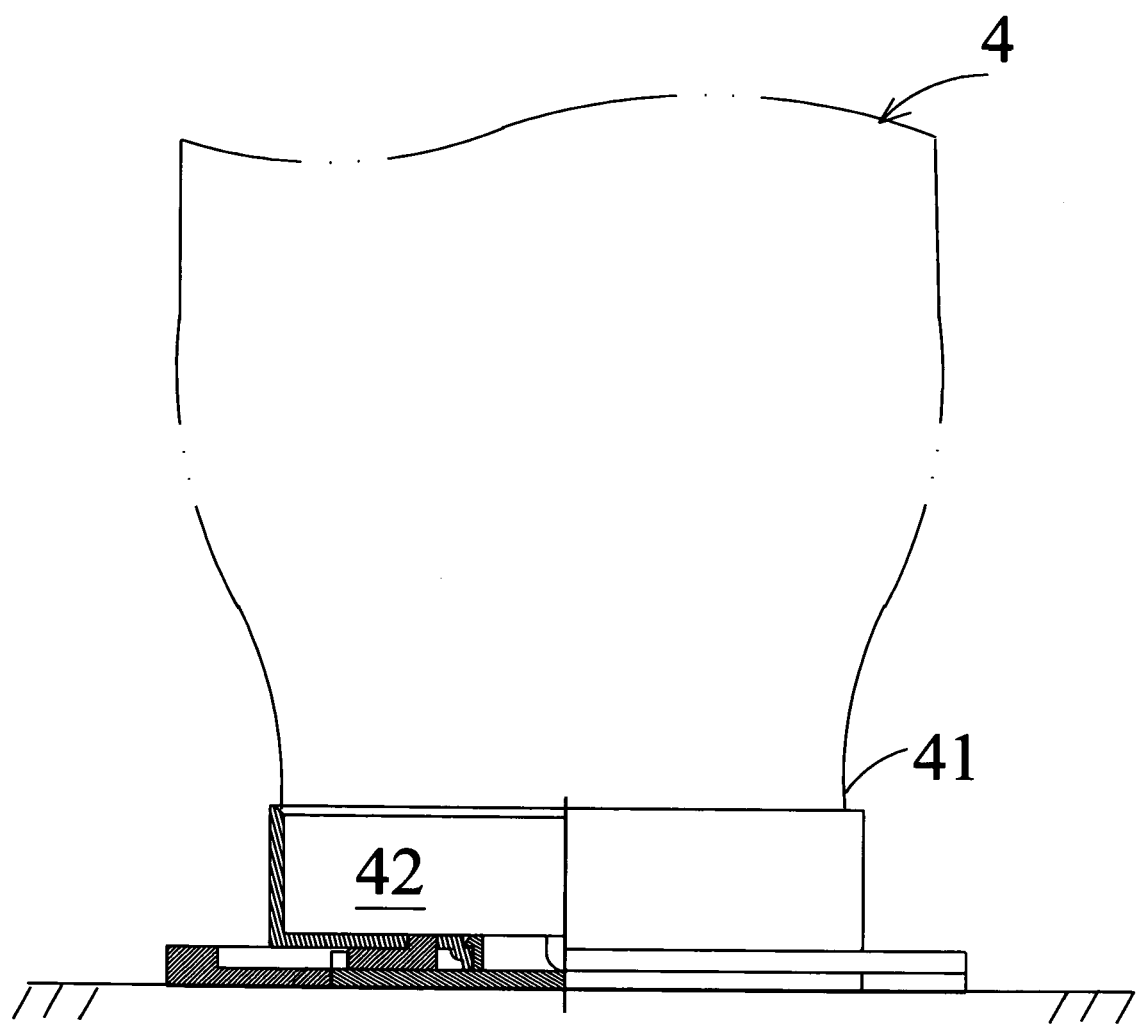
FIG. 6 is a sectional view of the invention coupling with a cup bottom.

Refer to FIGS. 1, 5a and 5b for assembly and operation of the invention. The stub shaft 31 of the paw 3 is coupled in the axle hole 12 of the shell 1 such that all the paws are in contact with the bottom side of the shell 1 and spaced from one another. The latch member 21 of the bottom tray 2 is coupled in the step opening 14 of the shell 1 with the hook section 201 latching on an indented ring 141 formed on the upper end of the step opening 14. The strut 22 of the bottom tray 2 is wedge in the slot 33 of the plate 30. The elongate extension 32 of each paw 3 is housed in the recess 201 of the bottom tray 2 as shown in FIG. 5a. Hence the paw 3 is sandwiched between the bottom side 13 of the shell 1 and the upper side of the tray surface 20 of the bottom tray 2 as shown in FIG. 1. As the elongate extension 32 of the paw 3 has a small size than the recess 201, there is a gap 202 formed there between. Hence user can apply an outward force on a wide end 321 of the extension 32 to move the paw 3 about the stub shaft 31 which serves as a fulcrum so that the paw 3 may be moved outwards from the periphery of the shell 1. During this process, the strut 22 of the bottom tray 2 is driven by the slot 33, and the bottom tray 2 is turned. As a result, all other paws 3 that do not receive the external force is driven about the stub shafts 31 and moved and extended outwards. Finally all the paws 3 are extended outside the periphery of the shell 1 to form a larger area.

By means of the foregoing structure, in normal conditions it is preferable that the bottom 41 of a cup 4 has a narrower bottom neck 42 to couple with the opening 11 of the shell 1. Of course, the bottom neck 42 may have screw threads on the surface, and the inner side of the opening 11 may also have mating screw threads to couple with the cup bottom. With the invention and the cup coupled in an integrated manner, the extension apparatus of the invention may be extended or retracted as desired according to the environments and requirements.

While the preferred embodiment of the invention has been set forth for the purpose of disclosure, modifications of the disclosed embodiment of the invention as well as other embodiment thereof may occur to those skilled in the art. Accordingly, the appended claims are intended to cover all embodiments which do not depart from the spirit and scope of the invention.

I claim:

1. A cup bottom extension apparatus comprising a shell, a bottom tray and a plurality of paws, wherein:

the shell is formed in a box with an opening on an upper side, an indented recess, and a bottom that has a plurality of axle holes formed thereon and a center opening and a collar around the center opening and extending downwards from the bottom;

the bottom tray has a latch member extended upwards from the center thereof and a plurality of struts surrounding the latch member and extending from a tray surface, and a plurality of recesses on the periphery spaced from one another; and each of the paws includes a plate, a stud shaft on one side of the plate, an elongate extension on other side of the plate and a slot formed between the stud shaft and the extension;

wherein the stud shaft of the paw is coupled in the axle hole to allow a paw to be in contact with the bottom side of the shell in a spaced manner, the latch member being coupled with the center opening of the shell, the strut being coupled in the slot of the paw such that the elongate extension of the paw is held in the recess of the bottom tray and the paw is sandwiched between the bottom side of the shell and an upper surface of the bottom tray.

2. The cup bottom extension apparatus of claim 1, wherein the center opening of the shell is a step opening.

3. The cup bottom extension apparatus of claim 1, wherein the latch member of the bottom tray has an opening end on an upper side to form a hook section.

4. The cup bottom extension apparatus of claim 1, wherein the elongate extension of the paw and the recess of the bottom tray form a gap there between.

* * * * *